May 29, 1928.  1,671,378
F. D. PITT
ELECTRIC HEATER
Filed June 7, 1926   2 Sheets-Sheet 1
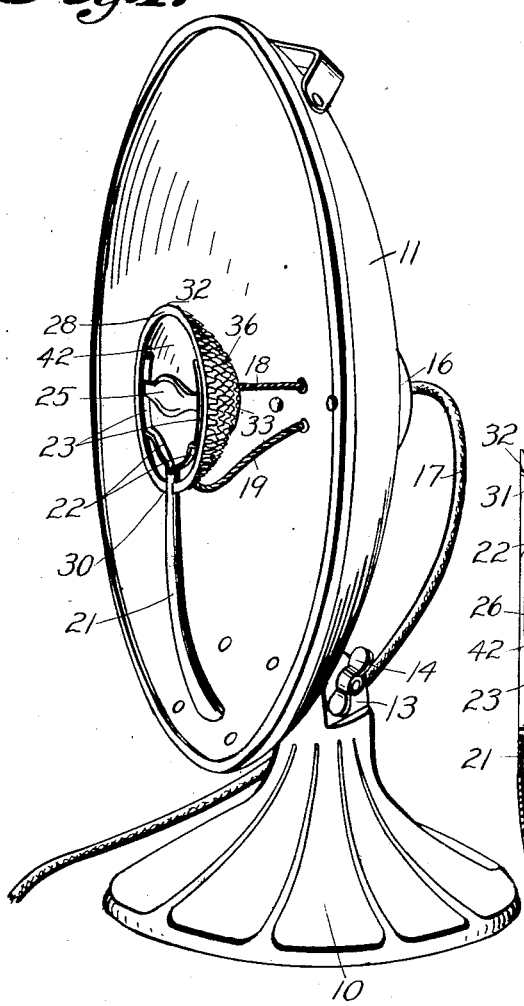
Fig.1.
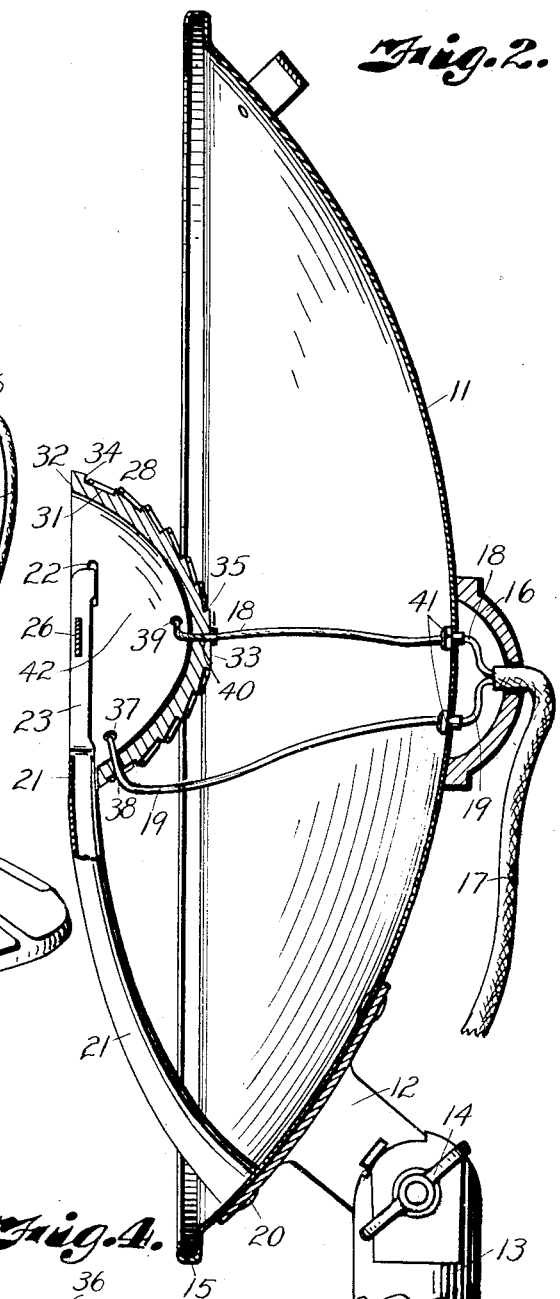
Fig.2.
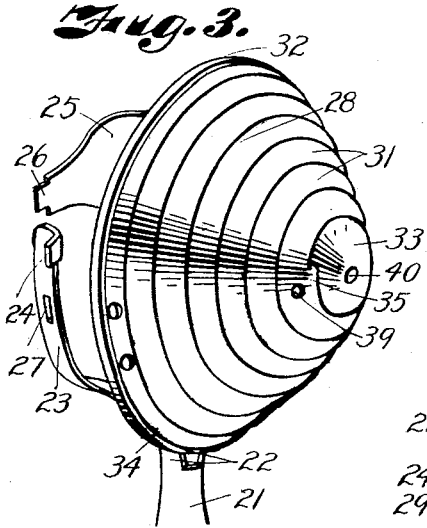
Fig.3.
Fig.5.
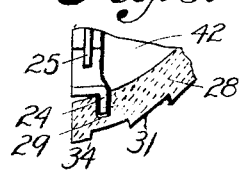
INVENTOR
Frederick D. Pitt
By Arthur E. Brown
ATTORNEY May 29, 1928.

F. D. PITT 1,671,378

ELECTRIC HEATER

Filed June 7, 1926

INVENTOR
Frederick D. Pitt.
BY
ATTORNEY

Patented May 29, 1928.

1,671,378

UNITED STATES PATENT OFFICE.

FREDERICK D. PITT, OF KANSAS CITY, MISSOURI, ASSIGNOR TO THE ANDERSON-PITT CORPORATION, OF KANSAS CITY, MISSOURI, A CORPORATION OF MISSOURI.

ELECTRIC HEATER.

Application filed June 7, 1926. Serial No. 114,175.

My invention relates to electric heaters and more particularly to the heating element of an electric heater and supporting means therefor.

It is a purpose of my invention to provide a heating element for a heater that is so constructed that the entire heating element faces the reflector of the heater so that the heat radiated from the element is all reflected outwardly by the reflector. The heating element is furthermore preferably so mounted relative to the focus of the reflector that the various portions thereof are as near the focus of the reflector as they can be placed. It is also a purpose of the invention to shape and relate the reflector and the heating element for heating equally all portions of a surface having a predetermined area spaced a predetermined distance from the heater.

More particularly it is a purpose of my invention to provide a heating element and a support therefor which support has a supporting surface facing the reflector, said supporting surface being provided with faces thereon defining a grooved seat which is substantially in the form of a spiral and upon which a heating element which is continuous from one end to the other end of the spiral is mounted. The heating element is preferably zigzag or sinuous in form instead of coiled, so that the same will lie flatly in the grooves.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings:

Fig. 1 is a perspective view of my improved electric heater.

Fig. 2 is a vertical sectional view thereof.

Fig. 3 is a perspective view of the heating element support and portions of the supporting bracket therefor separated.

Fig. 4 is a fragmentary detail view of the heating element, and

Fig. 5 is a fragmentary sectional view of the heating element support and the portion of the bracket engaging therewith.

Figure 6:
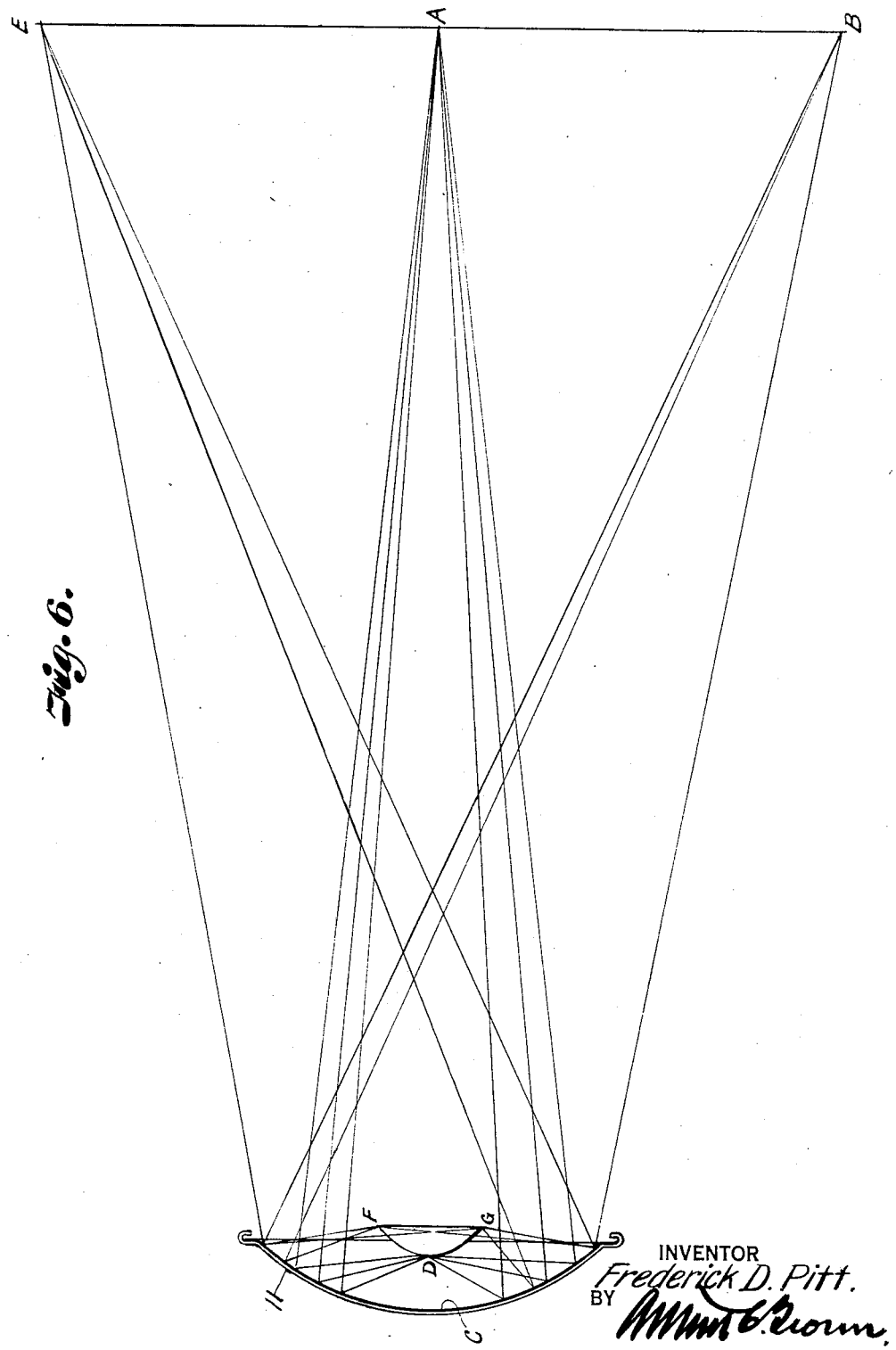
Fig. 6 is a diagrammatic view of the reflection of rays from the heating element by the reflector to a surface to be heated.

Referring more in detail to the drawings:

My improved electric heater comprises a base member 10 upon which is mounted a bowl-like reflector 11, the same being secured adjustably to the base member by means of a bracket 12 engaging with the standard 13 and being held in adjusted position by means of the clamping screw 14. The bowl-like reflector element is provided with the usual peripheral groove 15 for holding the guard member in position, the guard member being omitted from the drawings to more clearly show the internal construction of the heater. Secured to the rear face of the bowl member 11 is a canopy 16 into which the cable 17 extends in which the conductors 18 and 19 are provided.

Secured to the reflecting element 11 in any suitable manner, as by means of the rivet 20, is a bracket member having a standard 21 which is substantially tubular in form and which is split at the upper end thereof to provide the diverging arms 22 which have the upwardly extending portions 23 thereon that are curved substantially on the arc of a circle and which terminate in the outturned lip 24 extending in opposite directions. A transversely extending bracing element 25 having the reduced tongues 26 on the ends thereof engaging in the slots 27 in the arcuate portions 23 of the arms provided on the bracket, is provided to strengthen the bracket at the upper end thereof.

Mounted upon the bracket member is a heating element support 28 which is preferably of refractory material which is also electrical insulating material and which is provided with the recesses 29 which, as clearly shown in Fig. 5, do not extend entirely through the wall of the element 28, into which the outturned end portions 24 of the bracket member extend, thus supporting the heating element supporting member 28 upon the bracket. The heating element supporting member 28 is further preferably notched as at 30 to accommodate the tubular portion 21 of the bracket. The heating element support is spheroidal in contour and is provided with faces 31 which collectively form a spiral extending from the enlarged open end 32 of the supporting member 28 to the smaller closed end 33 thereof. Shoulders 34 and 35 are, however, provided respectively at opposite ends of the spiral so as to space the heating element mounted upon the spiral face on the member 28 from the opposite ends thereof.

The spiral face 31 is substantially straight across transversely of the element as viewed in Fig. 2, thus providing shoulders at opposite sides of the face and forming in effect a spiral groove for receiving the heating element. The heating element 36 is preferably made of a suitable resistance wire which is bent in a zigzag or substantially sinuous shape so that the element as formed is substantially straight transversely of the element and when placed in position in the spiral groove on the supporting member 28, will lie substantially flatly against the bottom of said groove. One end of the heating element 36 lies substantially opposite the opening 37 provided in the supporting member 28, and adjacent said opening is a similar opening 38. The conductor 19 extends through the opening 38 in spaced relation to the end of the heating element 36 and through the opening 37 where the same is connected with the one end of the heating element. The heating element then continues in a generally spiral form to the shoulder 35, an opening 39 being provided through the supporting member 28 through which the other conductor 18 extends, this conductor being secured to the end of the heating element 36 adjacent the shoulder 35. The conductor 18 also extends through a substantially central opening 40 in the supporting member 28 and out through the end 33 thereof, said conductors 18 and 19 extending through the bowl 11 and being provided with suitable insulating sleeves 41 where the same extend through said reflector bowl. As will be evident from Figs. 1 and 2, the supporting member 28 is substantially cup-shaped, being provided with a hollow or chamber 42 therein so as to make the same relatively light and furthermore to accommodate the portions of the bracket mounted within the same and for passage of the conductors 18 and 19 inside said supporting member.

The reflector and the heating element are shaped and related as described and illustrated, for the purpose of heating substantially equally all portions of surfaces exposed to the heater at a desired distance in front of the heater. The surface to be heated may be considered as included in a vertical plane perpendicular to the axis of the reflector, and, for example, six feet wide, six feet high, and located six feet from the reflector. The use of the principles whereby a heater is provided to effect such result is illustrated in Fig. 6, A of which represents the center point of a limited vertical circular plane having a three-foot radius A—B. The reflector 11, having the reflecting surface C, which is preferably ellipsoidally concave and has a focal point D or so-called true focus on the axis of the curve, is so positioned that its extended axis contains the point A, and said focal point D of the reflector is substantially six feet from the point A.

For purposes of illustration, a source of rays, E, is assumed to move over the vertical circular plane representing the vertical surface area to be heated. E is initially positioned in the circumference of the plane and is then assumed to move on the circumference of the plane, and so describe a circle. The assumed rays from the moving point E that reach the reflector are reflected therefrom to foci of the reflector that lie in a circular line indicated by the vertical diameter line F—G, said circular line defining substantially the location of the outer boundary, that is, the margin or periphery, of the heating element. The ray-projecting point E is then assumed to move over the entire surface of the vertical area circumscribed by the circle indicated by B—E, to project rays to the reflector for reflection to numerous foci of the reflector. Numerous rays are projected by the point E from each position that it occupies, all portions of the reflector receiving rays projected from each position; and all the rays projected from a particular position which reach the reflector are reflected to one point in space, that is, are concentrated in one point, i. e., one of the numerous foci of the reflector, one being said focal point D of the reflector. The foci thus identified define and lie in a convex surface containing substantially all of the foci for the rays from said limited vertical area that are received by the reflector.

The heating element is then arranged substantially over and substantially conformable to said convex foci-containing surface established by said assumed moving ray-projecting point E, and therefore is substantially entirely in focus with the reflector; whereby the converse phenomenon to the assumed phenomenon will occur, namely, the rays of heat projected from the element and received by the reflector, will be reflected to foci such as E, A and B on the area to be heated, indicated by B—E, and the said foci will be equally distributed over the area B—E so that all portions of the area will receive equal amounts of rays and will be equally heated. The heating element as thus provided will have a convex surface facing the reflector curved substantially complementarily to the reflector, and, therefore, preferably ellipsoidal; the axis of the convex heating element will lie in the axis of the reflector, and the apex of the heating element will be positioned adjacent the true focus, or focal point, of the reflector.

The heating element is preferably supported, as described, on a cup-like core, the core being constructed to conform substantially to the surface comprising the location of said foci of rays assumed to be projected from the area to be heated to the reflector. The element is substantially uniformly distributed over the convex face of the core to substantially cover the face; whereby substantially all the heat rays from the element are projected directly to the reflector, or reflected by the core to the reflector, so that substantially all the rays emitted by the element are reflected to the area to be heated, for maximum utilization of the reflecting surface and heat energy of the element for maximum and equal heating of the area to be heated.

I prefer to establish the curve of the reflector as the end portion of an ellipsoid of revolution, the end portion having a focal point adjacent the reflecting surface, the center point of the plane to be heated being the focal point of said ellipsoid opposite to the focal point of the reflector portion, and the axes of the reflector and the heating element lying in the major axis of the ellipsoid of revolution.

What I claim and desire to secure by Letters Patent is:

1. An electric heater comprising a reflector, a heating element including a cup-shaped core having its closed end facing the reflector, a resistance wire coiled on the surface of the core, and a standard on the reflector having attaching arms located within the open end of the core.

2. An electric heater comprising a reflector, a heating element including a cup-shaped core having its closed end facing the reflector, a resistance wire coiled on the surface of the core, a standard on the reflector having arms located within the open end of the core, and a brace spreading the arms to holding contact with the core.

3. An electric heater comprising a reflector, a heating element including a cup-shaped core having its closed end facing the reflector, a resistance wire coiled on the surface of the core, a standard on the reflector having arms keyed to the core within its open end, and a brace keyed to the arms and extending therebetween to retain the arms in holding contact with the core.

4. A heater comprising a reflector, and a convex heating element having its surface substantially in focus with said reflector.

5. An electric heater having a concave reflector any cross-section of which is substantially a portion of an ellipsoid of revolution, an electric heating unit therefor any cross-section of which is substantially a portion of an ellipsoid of revolution and having a convex face substantially conforming to the concave reflecting surface of the reflector, and means for mounting said heating unit with its face substantially in focus with said reflector.

6. In combination with a heater having a concave reflector comprising a surface adapted to reflect rays received from points in the axis of the reflector to a focal point in said axis, a heating element mounted in front of the reflector and axially thereof, the heating element having a convex face, the apex of the heating element being positioned substantially on said focal point of the reflector.

In testimony whereof I affix my signature.

FREDERICK D. PITT.